United States Patent [19]

Anderson et al.

[11] Patent Number: 4,980,340
[45] Date of Patent: Dec. 25, 1990

[54] METHOD OF FORMING SUPERCONDUCTOR

[75] Inventors: Raymond L. Anderson, Redding; Brian L. Oslin, Carmichael, both of Calif.

[73] Assignee: Ceracon, Inc., Sacramento, Calif.

[21] Appl. No.: 160,337

[22] Filed: Feb. 22, 1988

[51] Int. Cl.$^5$ .................. C04B 33/32; C04B 33/64
[52] U.S. Cl. .......................... 505/1; 264/65; 264/66; 264/320; 419/49; 505/739
[58] Field of Search ............... 264/56, 60, 63, 64, 264/65, 66, 67, 61, 109, 125, 320, 325; 505/1, 800, 822, 823, 739; 419/49

[56] References Cited

U.S. PATENT DOCUMENTS

| | | | |
|---|---|---|---|
| 2,807,082 | 9/1957 | Zambrow et al. | 29/488 |
| 3,350,179 | 10/1967 | Stenerson | 29/182.5 |
| 3,356,496 | 12/1967 | Hailey | 75/226 |
| 3,677,947 | 7/1972 | Ray et al. | 252/62.54 |
| 3,700,435 | 10/1972 | Chandhok | 75/214 |
| 3,706,579 | 12/1972 | Michael | 106/1 |
| 3,826,807 | 7/1974 | Green | 264/39 |
| 3,933,536 | 1/1976 | Doser et al. | 148/105 |
| 3,992,200 | 11/1976 | Chandhok | 75/211 |
| 4,265,681 | 5/1981 | Krause et al. | 148/111 |
| 4,389,362 | 6/1983 | Larsson | 419/8 |
| 4,446,100 | 5/1984 | Alderborn et al. | 419/48 |
| 4,460,711 | 2/1987 | Lichti et al. | 75/248 |
| 4,499,048 | 2/1985 | Hanejko | 419/49 X |
| 4,499,049 | 2/1985 | Hanejko | 419/49 |
| 4,501,718 | 2/1985 | Brandt | 419/49 |
| 4,518,441 | 5/1985 | Hailey | 419/49 |
| 4,539,175 | 9/1985 | Lichti | 419/49 |
| 4,541,877 | 9/1985 | Stadelmaier et al. | 419/12 |
| 4,568,516 | 2/1986 | Alderborn et al. | 419/26 |
| 4,597,938 | 7/1986 | Matsuura et al. | 419/23 |
| 4,601,875 | 7/1986 | Yamanoto et al. | 419/25 |
| 4,602,957 | 7/1986 | Pollock et al. | 75/246 |
| 4,656,002 | 4/1987 | Lizenby et al. | 419/10 |
| 4,663,066 | 5/1987 | Fruchart et al. | 252/62.51 |
| 4,684,406 | 8/1987 | Matsuura et al. | 75/244 |
| 4,689,163 | 8/1987 | Yamashita et al. | 252/62.54 |

OTHER PUBLICATIONS

Robinson et al., "Sinter-Forged YBa2Cu3O7-x", Advanced Ceramic Materials, vol. 2, No. 3B, Jul. 1987, pp. 380-387.
Johnson et al., "Fabrication of Cermic Articles from High Tc Superconducting Oxides", High Temperature Superconductors, ed Gubser et al., MRS Meeting, Apr. 23-24, 1987, pp. 193-195.
C. R. Paik, H. Miho, M. Okada, M. Homma, "Improvements of Coercive Force in Ce-Didymium-Fe-B Powders Prepared by Conventional Powder Techniques", 1987 Digest of Intermag '87, Intern Magnestics Conf, Apr. 14-17, Tokyo, Japan.
J. Ormerod, "Processing and Physical Metallurgy of NeFe B and Other R.E. Magnets", p. 69-92.
K. H. J. Bushcow, "New Permanent Magnet Materials", Mat Sci Rep 1, 1-64, 1986 North-Holland, Amsterdam.
D. Hadfield, "Perspective and Prospective Overview of Rare-Earth Transition Metal-Metalloid Permanent Magnets", pp. 420-425, 1987.

*Primary Examiner*—Jan H. Silbaugh
*Assistant Examiner*—Mary Lynn Fertig
*Attorney, Agent, or Firm*—William W. Haefliger

[57] ABSTRACT

The method of producing a superconducting product includes:
(a) providing a pressed-powder preform consisting essentially of $YBa_2Cu_3O_{7-x}$ where $0.0<x<0.5$,
(b) pre-heating the preform to elevated temperature,
(c) providing a grain bed and embedding the heated preform in that bed,
(d) and consolidating the preform to at least about 95% of theoretical density by application of pressure to the grain bed, thereby to form the product.

15 Claims, 1 Drawing Sheet

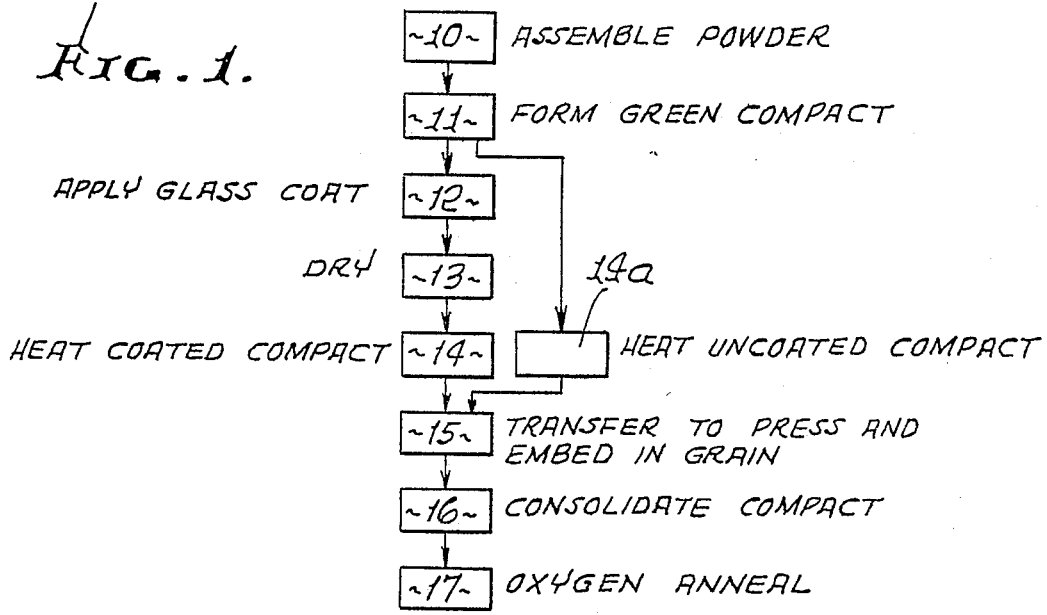
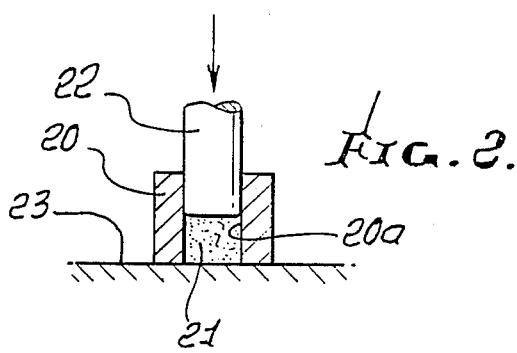
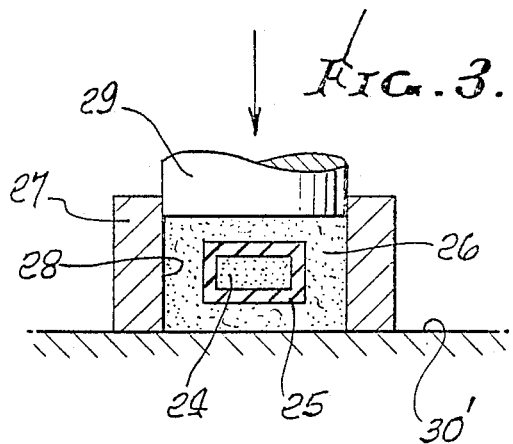
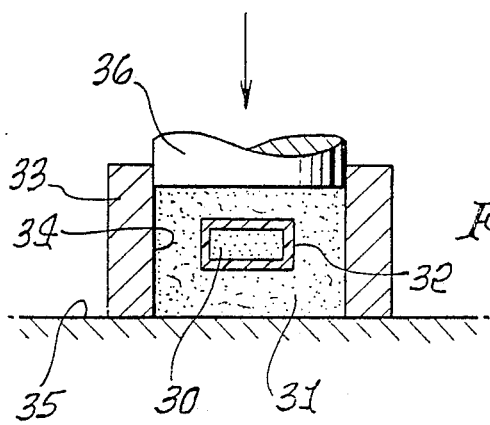

METHOD OF FORMING SUPERCONDUCTOR

BACKGROUND OF THE INVENTION

This invention relates generally to production of superconductors, i.e. products having extremely low resistance to flow of electrical current, and processes for the production of such products. Following the initial discovery of high transition temperatures ($T_c$) in the $K_2NiF_4$-type compound $La_{2-x}Ba_xCuO_4$, research activity upon superconducting oxides has recently been focused on the compound $YBa_2Cu_3O_{7-x}$ and its isostructural rare earth analogues. After the initial attainment of superconductivity at 95K there have been reports published in the scientific literature of evidence for $T_c$'s as high as 240K. Among all of these materials there are some common structural features; namely, the presence of CuO layers and a significant degree of anisotrophy due to an elongated c-axis in the orthorhombic unit cell. Early band structure work on compounds with the $K_2NiF_4$-type structure emphasized this reduced dimensionality and the impact of these crystallographic features on the superconducting properties.

Practical application of these remarkable materials requires control of the metallurgical processing techniques to attain optimal critical parameters, such as the critical current density ($J_c$) and upper critical magnetic field ($H_{c2}$), while preserving the high superconducting critical temperature ($T_c > 90K$). Technologically it is important to maximize these parameters at the boiling point of liquid nitrogen (77K) or above in order to utilize this convenient, inexpensive cryogenic liquid.

It is recognized that optimal $T_c$ values and homogeneity of the superconducting phase, as evidenced by narrow transition widths, are exceptionally sensitive to the oxygen concentration in the orthohombic phase of $YBa_2Cu_3O_{7-x}$ and its rare earth analogues. The best, consistent results occur for x in the range 0.1 to 0.2. This fact is of importance to all processing of bulk material.

While the potential technological impact of these materials is enormous, their immediate application is severely limited by certain inherent drawbacks. In their present state, the ceramic superconductors are brittle and unable to support any significant stress. In addition, they are environmentally unstable, as they easily react with atmospheric moisture/$CO_2$ and are decomposed by exposure to high temperatures. Furthermore, critical current densities achievable in present bulk materials are on the order of $10^3$ amp/cm$^2$ at zero field, whereas many of the applications envisaged require values over $10^5$ amp/cm$^2$, at quite high magnetic fields (>10T).

The bulk of the ongoing research on high $T_c$ superconductors is focused on the "123" compounds, more specifically $YBa_2Cu_3O_{7-x}$, where $0.0 < x < 0.5$. The superconducting form of this material ($T_c \approx 94K$) has an orthorhombic structure based on a stacking of three perovskite-like unit cells, $(BaCuO_{2.5}):(YCuO_{2.5})$ with rows of oxygen vacancies on the {001} type planes. The critical temperature appears to be very sensitive to the oxygen content, which in turn reflects the ionization state of the three Cu ions. When $x=0.5$ all the copper is present as $Cu^{2+}$, whereas at $x=0.0$ there is one $Cu^{3+}$ per unit cell (i.e. per molecule of $YBa_2Cu_3O_{7-x}$). Superconductivity requires an oxygen content of about $O_{6.9}$.

It is clear that oxygen control during processing is critical to successful superconductor fabrication. In the conventional processing approach the $YBa_2Cu_3O_{7-x}$ shapes are produced by mixing and pressing the individual oxides, in powder form, and which are then reacted/sintered, typically at 900°-950° C. in air for 12-16 hours.

The orthorhombic phase loses oxygen and transforms to a non-superconducting tetragonal structure at high temperatures, and accordingly, the sintered product is slowly cooled to allow oxygen pick-up and reversion to the superconducting form.

Product densities from 50-90% of the theoretical value (6.4 Mg/m$^3$) have been achieved by such conventional processing, the higher values ascribed to liquid phase sintering as $YBa_2Cu_3O_{7-x}$ decomposing peritectically into $Y_2BaCuO_5$, $BaCuO_2$ and CuO above 950° C. The porosity left in these compacts not only diminishes their structural integrity and increases the surface area exposed to environmental attack, but is believed to play an important role in reducing critical current densities. More importantly, the oxygen content varies during the process and within the final product, making it difficult to achieve homegeneity in composition/microstructure/properties. There is therefore need for a process which achieves significant improvements, as are characterized by the herein disclosed process, and including rapid densification of a powder preform close to 100% of theoretical, while retaining superconductivity, as will be described, and while minimizing micro-structural degradation.

SUMMARY OF THE INVENTION

It is a major object of the invention to provide a solution to the above problem and difficulties, and to achieve rapid and successful fabrication of superconductive products, employing $YBa_2Cu_3O_{7-x}$ (where $0.0 < x < 0.5$), or its rare earth analogues, in powder form, such powder prior to processing being superconductive.

Basic steps of the method include:
(a) providing a pressed-powder preform selected from the group consisting essentially of $YBa_2Cu_3O_{7-x}$, where $0.0 < x < 0.5$, and rare earth analogs thereof,
(b) pre-heating the preform to elevated temperature,
(c) providing a grain bed and embedding the heated preform in the bed,
(d) and consolidating the preform to at least about 95% of theoretical density by application of pressure to the grain bed, thereby to form the product. As will appear, the product so produced has a superconductivity temperature $T_c$ in excess of 90K.

Further features of the process include elevated temperature pre-heating of the preform, and of the grain bed, to between 870K and 1323K; progressively increasing pressure application to the grain bed from about zero to at least 60 Tsi, and while maintaining the preform at such elevated temperature or temperatures; and limiting the temperature of the preform during its consolidation to a level between about 500° and 1,000° C. to avoid $O_2$ loss and to avoid transformation of the molecular structure of said powder to the non-superconducting tetragonal phase. Such pressure application is controlled to complete the consolidation in less than about 10 minutes.

It is a further object of the invention to control such pre-heating of the preform and pressure application to the preform, during consolidation, to prevent loss of $O_2$ below level required for superconductivity. In this regard, $O_2$ loss below such levels is typically remedied by applying $O_2$ to the product, at elevated temperature, to effect $O_2$ absorption and enhanced superconductivity. This is, for example, carried out in an $O_2$ atmosphere at about 700° in an oven, and the $O_2$ treatment continued for up to about 24 hours for product of about 8 mm to ½ inch thickness; and for longer time intervals for thicker product.

Further, the grain bed typically consists of one of the following:

(a) ceramic particles
(b) carbonaceous particles
(c) a mixture of ceramic and carbonaceous particles.

Of these, ceramic grain particles are preferred, as carbonaceous particles tend to draw $O_2$ from the preform, at elevated temperature.

These and other objects and advantages of the invention, as well as the details of an illustrative embodiment, will be more fully understood from the following specification and drawings, in which:

DRAWING DESCRIPTION

FIG. 1 is a flow diagram illustrating steps of the process; and

FIGS. 2 and 3 are elevations, in section, showing use of equipment for compacting preforms; and FIG. 4 is an elevation, in section, showing use of equipment for consolidating a preform.

DETAILED DESCRIPTION

Referring to FIG. 1, it shows at 11 the initial cold-press formation of a "green" compact or preform, consisting of superconductive ceramic powder. The powder is initially assembled and placed in a forming mold, at 10.

Pressures employed at step 11 are typically between 10 and 100 tons per square inch (Tsi). FIG. 2 shows a die 20 having a bore 20a containing the mass 21 of particles which are being pressurized by a plunger 22, above a base 23, to form the compact. An alternative method is shown in FIG. 3, wherein the pre-form particles 24 are located within a flexible container 25 (elastomer, for example), embedded in a mass or bed 26 of grain particles. The latter are contained within a die 27 having a bore 28 receiving a plunger 29 for pressurizing the grain, above a fixed or a floatable base 30'. The flowable grain transmits pressure to the mass of particles 24, via the container or jacket 25, to form the compact or preform. The grain may consist of carbonaceous or ceramic particles, or mixtures thereof (see U.S. Patents Nos. 4,539,175, 4,499,049 and 4,501,718) of size 50–240 mesh, and which are flowable. The texts of those patents are incorporated herein, by reference.

Next, a vitreous (glassy) coating may then be applied to the preform, as indicated by step 12, as by dipping the green compact in a solution of glass frit in a carrier liquid such as isopropanol. One example is Deltaglaze 349 (a product of Acheson Colloids Company) diluted 1:2 or 1:3 in isopropanol. The subsequent step indicated at 13 comprises drying of the coating, at ambient conditions. Carrier liquid is thereby removed, leaving a remanent coating of glass adherent to preform and completely covering same. The coating thickness typically less than 1 mm is sufficient to adequately protect the preform from $O_2$ withdrawal during heating and consolidation.

Subsequently, the glass or vitreous material encapsulated preform is heated, as in a furnace, and for a time and at a temperature to facilitate subsequent bonding of the preform particles during consolidation under high pressure. Typically, the heating is continued for between 6–10 minutes, at a temperature or temperatures between 870K to 1,323 K. Heating time may be reduced using an inductance heater. See step 14 in FIG. 1. The furnace atmosphere may consist of air or pure $O_2$.

Such treatment enables transfer of the coated and heated preform, as in air (see step 15) to a consolidation press, wherein the hot, glass coated preform 30 is embedded in a grain bed 31. The coating also prevents $O_2$ loss with the preform, during transfer. FIG. 4 shows these elements, the glass coating indicated at 32.

If a coating is not employed, steps 12 and 13 are omitted, and the compact at 11 is next heated at 14a, under conditions as at 14.

The press includes a die 33 having a bore 34 containing the grain bed, about a base 35. A plunger 36 fits the bore and pressurizes the flowable grain, the latter transferring pressure to the preform at all sides thereon. The preform is reduced in size during consolidation. The consolidation step is indicated at 16 in FIG. 1.

The carbonaceous grain typically consists of flowable graphite particles which are fissured and have nodules thereon. See U.S. Patent No. 4,539,175. Alternatively and preferably, ceramic particles can be employed to reduce heat loss and $O_2$ loss from the heated preform. Mixtures of graphite and ceramic particles are usable. The grain temperature is desirably as high as or higher than that of the preform (25° C. to 350° C. higher) so as to maintain the preform at temperature between 870K and 1,323K during consolidation. Rapid consolidation is achieved by displacement of the plunger 36 toward and against the grain, indicated in FIG. 4.

The pressures used to consolidate the preform are increased from about zero to at least about 60 Tsi, while the preform is maintained at elevated temperatures, and to achieve at least about 95% of theoretical density. The holding time under maximum pressure is typically up to 30 seconds. By using conventional pressing equipment, the pressure available for consolidation is high enough for short consolidation cycle times. The short times at high temperatures result in very fine grain structures of the product, ensuring superconductivity. The temperature of the uncoated preform during its consolidation is limited to a level between about 500° C. and 1,100° C. to avoid $O_2$ loss, and to avoid transformation of the molecular structure of the consolidating powder to the non-superconducting tetragonal phase. Typically the pressure application is controlled to complete the consolidation in up to 1 minute.

Step 17, following consolidation, comprises applying $O_2$ to the compacted product, at elevated temperatures (between 550° and 750° C.) to effect $O_2$ absorption, and thereby enhancing superconductivity. For example, where an uncoated preform loses $O_2$ during heating and/or consolidation, which may destroy superconductivity, the $O_2$ loss is compensated by diffusing $O_2$ into the consolidated product for a time interval, and at $O_2$ atmosphere pressure levels and temperatures to restore superconductivity. This is referred to as "oxygen annealing". See above "SUMMARY".

EXAMPLE I $YBa_2Cu_3O_7$ powder was cold pressed in a hard die and 52.5 Tsi, and at room temperature. The shape of the pressed preform was a right cylinder, about 13 mm in height and 10 mm in diameter.

The preform was then heated for 6 to 10 minutes in a tubular furnace in air. The heating temperature was 900° C. The heated preform was quickly transferred in air to a ceramic grain filled die and completely embedded in the bed of heated particles as by a robot. The grain temperature was 25 to 225K higher than the preform temperature. The embedded preform was compressed under high uniaxial pressure applied to the grain by the action of a ram in the die, with pressure application as in FIG. 4. Pressure was steadily increased to 60 Tsi in about 10 seconds and held, for 30 seconds, after which the pressure was relieved and the consolidated part retrieved from the bed. The part was about 8 mm thick. The complete reference to the Ceracon process is to be found elsewhere [5.,6].

EXAMPLE II

Same as EXAMPLE I, except that as an alternative to cold pressing in a hard die, a quasi-isostatic cold pressing is carried out in graphite as a pressure-transmitting medium. (See FIG. 3). The powder was encapsulated in a rubber mold and placed inside the grain filled die. The die was then transferred into the hydraulic press and the ram compressed the grain at a pressure of 30-60 Tsi.

EXAMPLE III

Same as EXAMPLES I and II, except that green compacts, either cold-pressed in the hard die or in a grain bed, were coated with Deltaglaze 340 diluted 1:(2 to 3) in isopropanol. The coating was applied by dipping the green compact in the Deltaglaze solution for about one minute under vacuum. This coating proved to be a viable method of preventing oxygen loss from the powder during the transfer of the sample from the heating furnace to the die, and during consolidation.

The process is also applicable to other ceramic-type superconductors.

REFERENCES

1. J. Ormerod, "Processing and Physical Metallurgy of NeFe B and other R.E. Magnets", in "NdFe permanent Magnets: Their present and Future Applications", Elsevier Appl Sci Pub, London and New York p. 69-92.
2. K. H. J. Bushcow, "New Permanent Magnet Materials", Mat Sci Rep 1, 1-64, 1986 North-Holland, Amsterdam.
3. D. Hadfield, "Perspective and Prospective Overview of Rare-Earth Transition Metal - Metalloid Permanent Magnets", Met Powder Rep., 42, 420-425 (1987).
4. C. R. Paik, H. Miho, M. Okada, M. Homma, "Improvements of Coercive Force in Ce-Didymium-Fe-B Powders Prepared by Conventional Powder Techniques", 1987 Digest of Intermag '87, Intern Magnetics Conf, April 14-17, Tokyo, Japan GG03.
5. W. P. Lichti, A. F. Hofstatter, "Method of Object Consolidation Employing Graphite Particulate", U.S. Patent No. 4,640,711, Feb. 3, 1987.
6. F. G. Hanejko, "Method of Consolidating a Metallic or Ceramic Body", U.S. Patent No. 4,499,049, Feb. 12, 1985.

We claim:

1. In the method of producing a superconducting product, the steps comprising:
   (a) providing a pressed-powder preform selected from the group consisting essentially of $YBa_2Cu_3O_{7-x}$, where $0.0 < x < 0.5$, and rare earth analogs thereof,
   (b) pre-heating the preform to elevated temperature,
   (c) providing a grain bed and embedding the heated preform in said bed,
   (d) consolidating the preform to at least about 95% of theoretical density by application of pressure to the grain bed, thereby to form said product,
   (e) and including controlling said preheating of the preform and said pressure application to the preform during consolidation to prevent loss of $O_2$ below levels required for superconductivity, said controlling including progressively increasing said pressure to about 60 TSI, while said elevated temperature is maintained.

2. The method of claim 1 wherein said $YBa_2Cu_3O_{7-x}$ product has a superconducting temperature Tc in excess of 90 Kelvin.

3. The method of claim 1 wherein said elevated temperature is between 870K and 1,323K.

4. The method of claim 1 including pre-heating the grain bed to a temperature at least about as high as that of said pre-heated preform.

5. The method of claim 4 wherein the pre-heated preform is transferred into said pre-heated grain bed.

6. The method of claim 5 including removing the preform from the grain bed after said consolidation thereof.

7. The method of claim 1 including limiting the temperature of the preform during its consolidation to a level between about 500° C. and 1,100° C. to avoid $O_2$ loss and to avoid transformation of the molecular structure of said powder to the non-superconducting tetragonal phase.

8. The method of claim 1 wherein said pressure application is controlled to complete said consolidation in less than about one minute.

9. The method of claim 1 including applying $O_2$ to the product, at elevated temperature, to effect $O_2$ absorption and enhanced superconductivity.

10. The method of claim 1 wherein the grain bed consists of one of the following:
    (a) ceramic particles
    (b) carbonaceous particles
    (c) a mixture of ceramic and carbonaceous particles.

11. The method of claim 9 wherein $O_2$ is applied at about 700° C., for at least about twenty-four hours.

12. In the method of producing a superconducting product, the steps comprising:
    (a) providing a pressed-powder preform consisting of superconducting ceramic powder,
    (b) pre-heating the preform to elevated temperature,
    (c) providing a grain bed and embedding the heated preform in said bed,
    (d) and consolidating the preform to at least about 95% of theoretical density by application of pressure to the grain bed, thereby to form said product,
    (e) and wherein said pressure application to the grain bed is progressively increased from about zero to a level to achieve said density, and while maintaining the preform at said elevated temperature.

13. The method of claim 12 wherein said product has a superconducting temperature Tc in excess of 90 Kelvin.

14. The method of claim 12 wherein said elevated temperature is between 870 K. and 1,323 K.

15. The method of claim 12 including pre-heating the grain bed to a temperature at least about as high as that of said pre-heated preform.

* * * * *